US011392680B2

(12) United States Patent
Sun

(10) Patent No.: US 11,392,680 B2
(45) **Date of Patent: *Jul. 19, 2022**

(54) AUTHENTICATION AND GENERATION OF INFORMATION FOR AUTHENTICATION

(71) Applicant: Advanced New Technologies Co., Ltd., George Town (KY)

(72) Inventor: Xiaokai Sun, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/721,663

(22) Filed: Dec. 19, 2019

(65) Prior Publication Data

US 2020/0134161 A1 Apr. 30, 2020

Related U.S. Application Data

(63) Continuation of application No. 16/176,766, filed on Oct. 31, 2018, which is a continuation of application No. PCT/CN2017/079862, filed on Apr. 10, 2017.

(30) Foreign Application Priority Data

May 5, 2016 (CN) ........................ 201610292695.4

(51) Int. Cl.

| | |
|---|---|
| ***G06F 21/36*** | (2013.01) |
| ***H04W 12/68*** | (2021.01) |

(Continued)

(52) U.S. Cl.

CPC .......... *G06F 21/36* (2013.01); *G06F 3/04883* (2013.01); *G06F 21/316* (2013.01);

(Continued)

(58) Field of Classification Search

CPC .... G06F 21/36; G06F 3/04883; G06F 21/316; G06F 3/01; G06F 7/00; H04W 12/00508; H04W 12/06; G06T 1/00; H04L 9/3226

(Continued)

(56) References Cited

U.S. PATENT DOCUMENTS

| | | |
|---|---|---|
| 5,559,961 A | 9/1996 | Blonder |
| 8,819,812 B1 | 8/2014 | Weber et al. |

(Continued)

FOREIGN PATENT DOCUMENTS

| | | |
|---|---|---|
| CN | 102243754 | 11/2011 |
| CN | 103488404 | 1/2014 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Seweye Gelagay
*Assistant Examiner* — Moeen Khan
(74) *Attorney, Agent, or Firm* — Fish & Richardson P.C.

(57) ABSTRACT

Implementations of data security technologies are disclosed. In an implementation, a plurality of feature points of a user-selected image are determined. A first plurality of interactive operations performed on at least a portion of the plurality of feature points by a user are detected during lock screen passcode set up of a mobile computing device. The first plurality of interactive operations are stored. The user-selected image is displayed on a lock screen when the mobile computing device is in a locked state. A second plurality of interactive operations on a touchscreen of the mobile computing device are detected when the mobile computing device is in the locked state, and the mobile (Continued)

Password information setting starts

Receive a customized picture uploaded by a first user — S801

Determine a picture feature detection algorithm specified by the first user, and determine a plurality of feature areas on the received picture based on the picture feature detection algorithm — S802

Display the picture, mark the feature area, and generate corresponding identification information for the feature area — S803

Detect a tapping operation of the first user for the feature area — S804

Generate a feature area identification information sequence used to indicate a detected tapping order of the first user for the feature area based on the identification information of the feature area and the tapping order, and user the feature area identification information sequence as standard information — S805

Receive a double confirmation of the first user for the standard information — S806

Determine whether to mark the feature area on the displayed picture during standard information authentication based on an indication of the first user — S807

Password information setting ends computing device is unlocked if the second plurality of interactive operations match the first plurality of interactive operations.

14 Claims, 12 Drawing Sheets

(51) Int. Cl.

| | |
|---|---|
| ***G06F 3/04883*** | (2022.01) |
| ***G06F 21/31*** | (2013.01) |
| ***G06F 3/01*** | (2006.01) |
| ***G06F 7/00*** | (2006.01) |
| ***H04L 9/32*** | (2006.01) |
| ***G06T 1/00*** | (2006.01) |
| ***H04W 12/06*** | (2021.01) |

(52) U.S. Cl.
CPC ............... *H04W 12/68* (2021.01); *G06F 3/01* (2013.01); *G06F 7/00* (2013.01); *G06T 1/00* (2013.01); *H04L 9/3226* (2013.01); *H04W 12/06* (2013.01)

(58) Field of Classification Search
USPC ............................................................ 726/19
See application file for complete search history.

(56) References Cited

U.S. PATENT DOCUMENTS

| | | | | |
|---|---|---|---|---|
| 9,058,765 | B1 * | 6/2015 | Mallick | G06Q 30/0601 |
| 9,558,426 | B2 | 1/2017 | Song et al. | |
| 9,607,138 | B1 * | 3/2017 | Baldwin | G06F 21/32 |
| 10,489,912 | B1 * | 11/2019 | Brailovskiy | H04N 13/246 |
| 2004/0010721 | A1 | 1/2004 | Kirvovski et al. | |
| 2004/0230843 | A1 | 11/2004 | Jansen | |
| 2009/0313693 | A1 | 12/2009 | Rogers | |
| 2010/0325721 | A1 | 12/2010 | Bandyopadhyay et al. | |
| 2011/0283353 | A1 | 11/2011 | Maetz et al. | |
| 2012/0304284 | A1 | 11/2012 | Johnson et al. | |
| 2013/0135226 | A1 * | 5/2013 | Ho | G06F 3/04883 345/173 |
| 2014/0058941 | A1 * | 2/2014 | Moon | G06Q 20/32 705/42 |
| 2014/0181957 | A1 | 6/2014 | Nguyen et al. | |
| 2015/0002431 | A1 * | 1/2015 | Lee | G06F 3/0488 345/173 |
| 2015/0121316 | A1 * | 4/2015 | Chang | G06F 3/0488 715/863 |
| 2015/0304303 | A1 | 10/2015 | Thibadeau, Sr. et al. | |
| 2016/0316357 | A1 * | 10/2016 | Liu | H04W 8/205 |
| 2016/0364564 | A1 * | 12/2016 | Lee | G06F 3/0484 |
| 2017/0243063 | A1 | 8/2017 | Kaneko et al. | |
| 2017/0255772 | A1 | 9/2017 | Hu | |
| 2019/0056859 | A1 * | 2/2019 | Li | G06F 3/04842 |
| 2019/0065729 | A1 | 2/2019 | Sun | |

FOREIGN PATENT DOCUMENTS

| | | |
|---|---|---|
| CN | 104156654 | 11/2014 |
| CN | 104200150 | 12/2014 |
| JP | 2005082086 | 3/2005 |
| JP | 2011524592 | 9/2011 |
| JP | 2012212300 | 11/2012 |
| JP | 2013515318 | 5/2013 |
| JP | 2013190992 | 9/2013 |
| JP | 2014520313 | 8/2014 |
| JP | 2015049608 | 3/2015 |
| KR | 20110031328 | 3/2011 |
| KR | 20150003957 | 1/2015 |
| TW | 1510954 | 12/2015 |
| TW | 1528213 | 4/2016 |
| WO | WO 2011158768 | 12/2011 |
| WO | WO 2013189354 | 12/2013 |

OTHER PUBLICATIONS

Extended European Search Report in European Application No. 17792404.0, dated Oct. 23, 2019, 11 pages.

International Search Report by the International Searching Authority issued in International Application No. PCT/CN2017/079862 dated Jul. 17, 2017; 10 pages.

Nakamoto, "Bitcoin: A Peer-to-Peer Electronic Cash System," www.bitcoin.org, 2005, 9 pages.

PCT International Preliminary Report on Patentability in International Application No. PCT/CN2017/079862, dated Nov. 6, 2018, 10 pages (with English translation).

Zhao et al., "Picture Gesture Authentication," ACM Transactions on Information and System Security, Apr. 2015, 17(4)1-37.

Shahzad et al., "Secure Unlocking of Mobile Touch Screen Device by Simple Gestures—You can see it but you cannot do it," ACM, Sep. 30, 2013, 12 pages.

* cited by examiner

AUTHENTICATION AND GENERATION OF INFORMATION FOR AUTHENTICATION

CROSS-REFERENCE TO RELATED APPLICATIONS

This application is a continuation of U.S. application Ser. No. 16/176,766, filed on Oct. 31, 2018, which is a continuation of PCT Application No. PCT/CN2017/079862, filed on Apr. 10, 2017, which claims priority to Chinese Patent Application No. 201610292695.4, filed on May 5, 2016, and each application is hereby incorporated by reference in its entirety.

TECHNICAL FIELD

The present application relates to the field of information security technologies, and in particular, to an authentication method and device, and a method and a device for generating information for authentication.

BACKGROUND

With the rapid development of information technologies, users pay more attention to information security. Authentication is a common method used to ensure information security.

For example, a terminal device of a first user performs authentication. The first user can predetermine standard information (e.g., a password) for authentication. After the standard information is set, the terminal device can perform authentication on any user (referred to as a second user) performing a specific operation on the terminal device based on the standard information. If the second user can correctly enter the standard information, the terminal device can authenticate the second user as the first user. Otherwise, the terminal device can determine that the second user is not the first user but an attacker, and therefore, can prevent the second user from performing the specific operation. As such, information security of the first user on the terminal device can be improved. The specific operation can be a screen unlock operation, a login operation, a personal information modification operation, a payment operation, etc.

In the existing technology, the standard information can be a gesture password, and authentication can be performed based on the gesture password. Specifically, there are nine key node areas in a gesture password input interface provided by an operating system or an application of the terminal device, and the nine key node areas are distributed in the form of a nine-box grid, as shown in the gesture password input interface in FIG. 1. The first user can set a two-dimensional track that connects at least two key node areas as the gesture password. After the gesture password is set, when the terminal device performs authentication on the second user, the second user can be authenticated only when the second user connects key node areas in the gesture password input interface to reproduce a gesture corresponding to the gesture password.

However, gesture password input interfaces in the existing technology are undiversified, and attackers are usually familiar with the gesture password input interface. Therefore, the difficulty of the attacker in peeping at and memorizing the gesture password entered by the first user is reduced, and/or the difficulty of the attacker in cracking the gesture password set by the first user through exhaustive attack is reduced, causing relatively low authentication reliability.

SUMMARY

Implementations of the present application provide an authentication method and device, to alleviate a problem of relatively low authentication reliability caused by undiversified gesture password input interfaces in the existing technology.

The implementations of the present application provide a method and a device for generating information for authentication.

The following technical solutions are used in the implementations of the present application:

The authentication method provided in the implementations of the present application includes the following: displaying a picture pre-specified by a first user; detecting an interactive operation of a second user for the picture; generating interactive operation information of the second user based on the detected interactive operation of the second user; and performing authentication to determine whether the second user is the first user by matching the interactive operation information of the second user and standard information, where the standard information is generated based on an interactive operation of the first user for the picture.

The authentication device provided in the implementations of the present application includes a display module, configured to display a picture pre-specified by a first user; a detection module, configured to detect an interactive operation of a second user for the picture; a generation module, configured to generate interactive operation information of the second user based on the detected interactive operation of the second user; and an authentication module, configured to perform authentication to determine whether the second user is the first user by matching the interactive operation information of the second user and standard information, where the standard information is generated based on an interactive operation of the first user for the picture.

The method for generating information for authentication provided in the implementations of the present application includes the following: obtaining a picture specified by a first user; displaying the picture, and determining one or more feature areas on the picture; detecting an interactive operation of the first user for the one or more feature areas; and generating standard information based on the detected interactive operation of the first user so as to perform authentication to determine whether a second user is the first user.

The device for generating information for authentication provided in the implementations of the present application includes an acquisition module, configured to obtain a picture specified by a first user; a display and determining module, configured to display the picture, and determine one or more feature areas on the picture; a detection module, configured to detect an interactive operation of the first user for the one or more feature areas; and a generation module, configured to generate standard information based on the detected interactive operation of the first user, so as to perform authentication to determine whether a second user is the first user.

The at least one technical solutions used in the implementations of the present application can achieve the following beneficial effects: The picture specified by the first user can be used as a gesture password input interface customized by the first user, and the interactive operation can include a gesture, to diversify gesture password input interfaces. Feature area locations of gesture password input interfaces corresponding to different pictures are usually different, and a feature area location of the gesture password input interface corresponding to the picture specified by the first user is also different from a feature area location of a gesture password input interface in the existing technology. Therefore, an attacker may not be familiar with the gesture password input interface corresponding to the picture. As such, the difficulty of the attacker in peeping at and memorizing the gesture password entered by the first user can be increased, and/or the difficulty of the attacker in cracking the gesture password set by the first user through exhaustive attack can be increased, thereby improving authentication reliability. Therefore, the present application can partly or wholly alleviate the problem in the existing technology.

BRIEF DESCRIPTION OF DRAWINGS

The accompanying drawings here are used to provide further understanding of the present application, and constitute a part of the present application. Example implementations of the present application and descriptions of the implementations are used to explain the present application, and do not constitute an improper limitation to the present application. In the accompanying drawings.

DESCRIPTION OF IMPLEMENTATIONS

To make the objectives, technical solutions, and advantages of the present application clearer, the following clearly and completely describes the technical solutions of the present application with reference to the specific implementations and the corresponding accompanying drawings of the present application. Apparently, the described implementations are some rather than all of the implementations of the present application. All other implementations obtained by a person of ordinary skill in the art based on the implementations of the present application without creative efforts shall fall within the protection scope of the present application.

The solutions of the present application can be used for authentication, for example, can be used to perform authentication on a second user (that is, a user to be authenticated) when the second user performs a specific operation. The specific operation can be a screen unlock operation, a login operation, a personal information modification operation, a payment operation, etc. The solutions of the present application can partly or wholly alleviate the problem in the existing technology, and the following describes the solutions of the present application.

Figure 1:
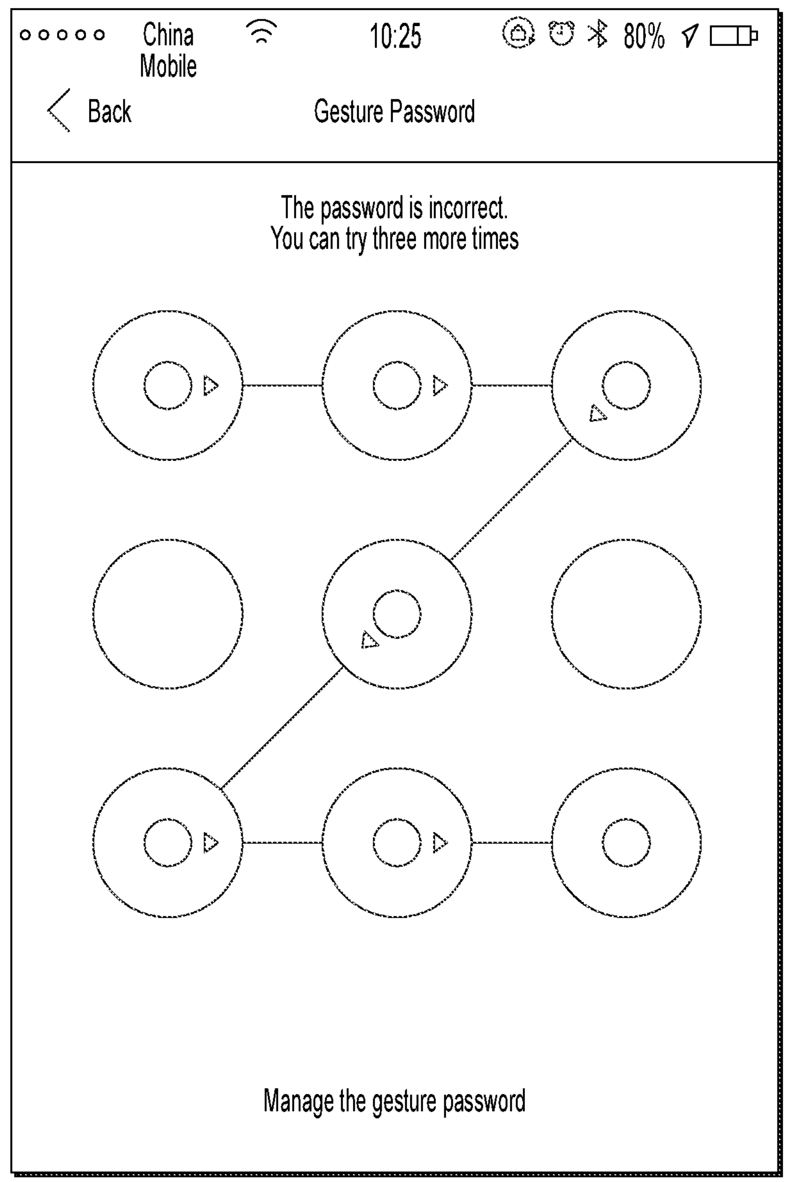
FIG. 1 is a schematic diagram illustrating a gesture password input interface in the existing technology.
Figure 2:
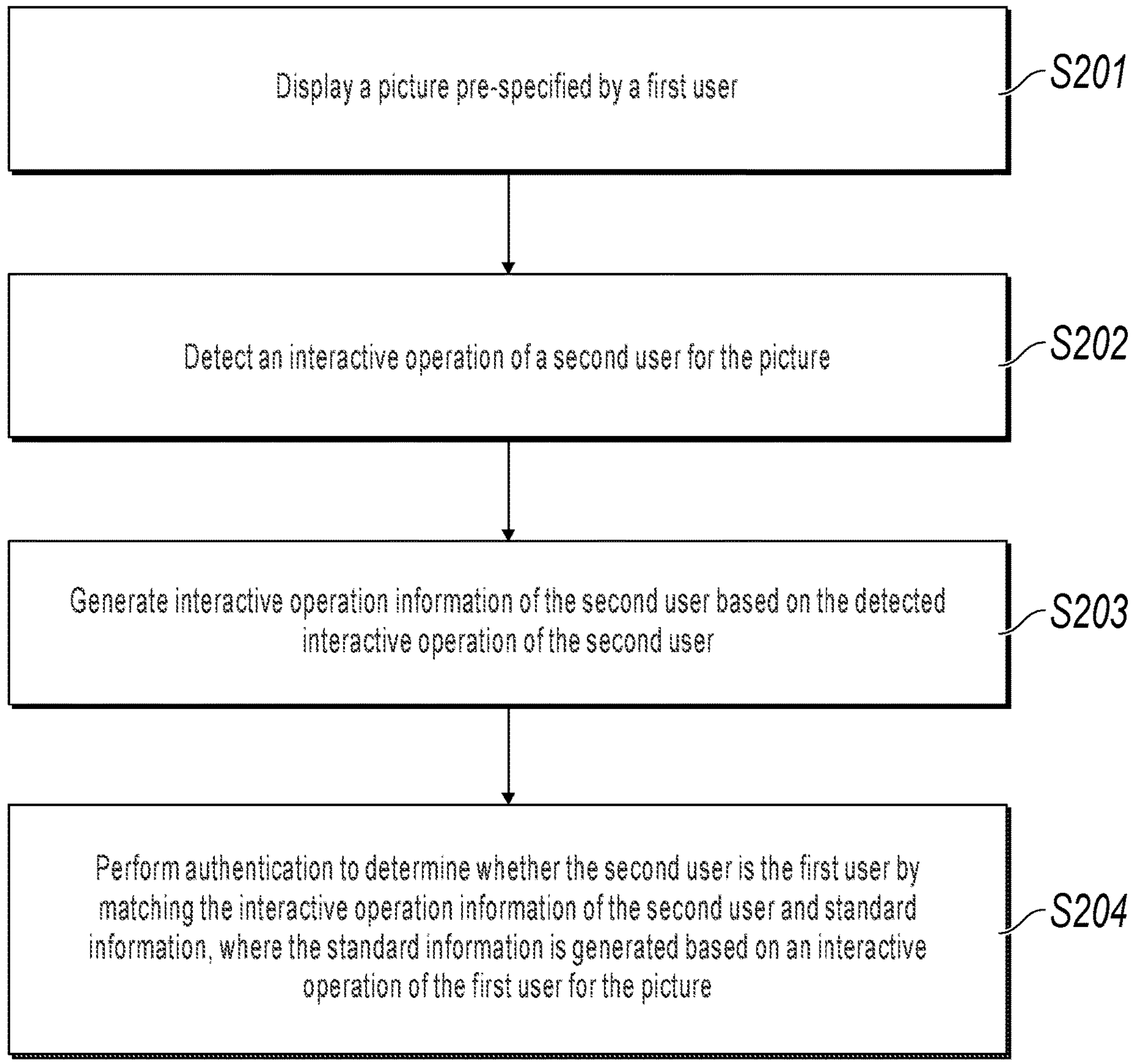
FIG. 2 is a schematic flowchart illustrating an authentication method, according to an implementation of the present application.

FIG. 2 is a schematic flowchart illustrating an authentication method, according to an implementation of the present application. The procedure can be performed by an authentication-related device. The device includes but is not limited to a mobile phone, a tablet, a smart watch, a vehicle mobile system, a personal computer, a large or medium-sized computer, a computer cluster, etc. The execution body does not constitute a limitation to the present application.

The procedure in FIG. 2 can include the following steps.

S201. Display a picture pre-specified by a first user.

For ease of description, the picture pre-specified by the first user in step S201 can be referred to as a specific picture below.

In this implementation of the present application, before the procedure in FIG. 2 is performed, standard information used for authentication can be generated in advance based on operation of the first user. In the procedure in FIG. 2, authentication is performed on a second user based on the standard information. In practice, the second user can be the first user, or the second user can be a user other than the first user, for example, an attacker. It can be determined whether the second user is the first user through authentication in the procedure in FIG. 2.

In this implementation of the present application, the standard information can be generated based on the specific picture, and the specific picture is specified by the first user. For example, the first user can specify a picture prestored locally or on a cloud as the specific picture, or can specify a new picture obtained in a specific way as the specific picture. For example, an execution body with a camera can take a picture and specify the picture as the specific picture.

S202. Detect an interactive operation of a second user for the picture.

In this implementation of the present application, in step S202, an interactive operation of the second user for any area on the picture can be detected, or an interactive operation of the second user for only one or more feature areas on the picture can be detected.

S203. Generate interactive operation information of the second user based on the detected interactive operation of the second user.

In this implementation of the present application, the interactive operation can be one or more operations such as tapping, sliding, and pressing, and the interactive operation information can reflect interactive operation content corresponding to the interactive operation information.

It is worthwhile to note that the listed operations are merely examples of interactive operations, and the interactive operation can be operations other than these operations. Operations such as tapping, sliding, and pressing can be further divided so that the interactive operation content is described by using more specific features (the interactive operation content is more specific). For example, the tapping operation can be further divided based on features such as tapping force, tapping time, number of taps, and tapping frequency, the sliding operation can be further divided based on features such as sliding track, sliding time, sliding force, and sliding distance, and the pressing operation can be further divided based on features such as pressing time and pressing force.

A level of specificity of the interactive operation content is not limited in the present application. Generally, when the interactive operation content is more specific, the corresponding interactive operation information generated can also be more specific, and authentication can also be performed more strictly based on the interactive operation information. The level of specificity of the interactive operation content can be pre-specified as actually required.

For example, the interactive operation is the tapping operation. When the specified level of specificity is relatively low, only the number of taps can be detected, but the tapping force or the tapping time is not detected. When the specified level of specificity is relatively high, the number of taps, the tapping force, the tapping time, etc. can be detected.

For another example, the interactive operation is the sliding operation. When the specified level of specificity is relatively low, only the sliding track can be detected, but the sliding time or the sliding force is not detected. When the specified level of specificity is relatively high, the sliding track, the sliding time, the sliding force, etc. can be detected.

S204. Perform authentication to determine whether the second user is the first user by matching the interactive operation information of the second user and standard information, where the standard information is generated based on an interactive operation of the first user for the picture.

In this implementation of the present application, as described above, after the standard information used for authentication is generated in advance, a picture (that is, the specific picture) for generating the standard information can be displayed when authentication needs to be performed on the second user (corresponding to step S201). The second user can be authenticated only when the second user reproduces an interactive operation corresponding to the standard information for the specific picture displayed (corresponding to steps S202 to S204). The interactive operation corresponding to the standard information is the interactive operation of the first user for the picture used to generate the standard information.

For example, the specific picture can be used as a gesture password input interface customized by the first user. In this case, an interactive operation of the first user for one or more feature areas on the specific picture can be considered as a gesture, and the specified standard information can be considered as a gesture password. During authentication, the specific picture can be displayed, and the second user can be authenticated only when the second user performs an interactive operation for the one or more feature areas on the specific picture to reproduce the gesture of the first user.

In this implementation of the present application, it can be seen from the previous descriptions that the interactive operation information of the second user can reflect interactive operation content of the second user for the specific picture, and the standard information can reflect interactive operation content of the first user for the specific picture. Therefore, it can be determined whether the second user has reproduced the operation of the first user by matching the interactive operation information of the second user and the standard information, to further determine whether the second user is the first user through authentication.

It is worthwhile to note that a specific detection method used to detect the interactive operation of the second user is usually the same as or similar to a specific detection method used to detect the interactive operation of the first user during generation of the standard information (otherwise, it is inappropriate to match the interactive operation information of the second user and the standard information because comparability between the interactive operation information of the second user and the standard information may be relatively low). As such, the interactive operation information of the second user and the standard information can be matched, and the method for performing authentication based on interactive operation information matching can be more reliable in the present application.

based on the previously described method, the picture specified by the first user can be used as the gesture password input interface customized by the first user, and the interactive operation can include a gesture, to diversify gesture password input interfaces. Feature area locations of gesture password input interfaces corresponding to different pictures are usually different, and a feature area location of the gesture password input interface corresponding to the picture specified by the first user is also different from a feature area location of a gesture password input interface in the existing technology. Therefore, an attacker may not be familiar with the gesture password input interface corresponding to the picture. As such, the difficulty of the attacker in peeping at and memorizing the gesture password entered by the first user can be increased, and/or the difficulty of the attacker in cracking the gesture password set by the first user through exhaustive attack can be increased, thereby improving authentication reliability. Therefore, the present application can partly or wholly alleviate the problem in the existing technology.

In addition, the method has more advantages compared with the existing technology. Specifically, a gesture in the existing technology corresponds to a relatively small quantity of operation types, a level of specificity is also relatively low, and only a sliding operation is usually included. Corresponding gesture information generated usually describes only a sliding track, but does not describe sliding time, sliding force, or other feature information. In addition to the gesture (the sliding operation) in the existing technology, the interactive operation in the present application can include more operation types (e.g., a tapping operation and a pressing operation). For the operation types included, a level of specificity can be customized for interactive operation content generated through these operations, so that interactive operation information generated can be more specific (compared with the gesture information in the existing technology), thereby making authentication stricter and improving information security of the first user.

In addition, based on the previously described method, a user can choose not to use the specific gesture password input interface in the existing technology, but freely select a picture that the user likes so as to generate a corresponding gesture password input interface. Thus, the gesture password input interface can be better customized and user experience can be improved.

It is worthwhile to note that the steps in the procedure in FIG. 2 can be performed by one device, or can be performed by different devices. For example, step 201 can be performed by device 1, and steps 202 to 204 can be performed by device 2; or steps 201 to 203 can be performed by device 1, and step 204 can be performed by device 2.

Based on the previously described method, this implementation of the present application further provides some specific implementation solutions of the authentication method and extension solutions, which are described below.

In this implementation of the present application, as mentioned above, the standard information in FIG. 2 can be generated based on the interactive operation of the first user for the picture. For ease of understanding, the following describes a procedure of generating the standard information in FIG. 2, as shown in FIG. 3.

Figure 3:
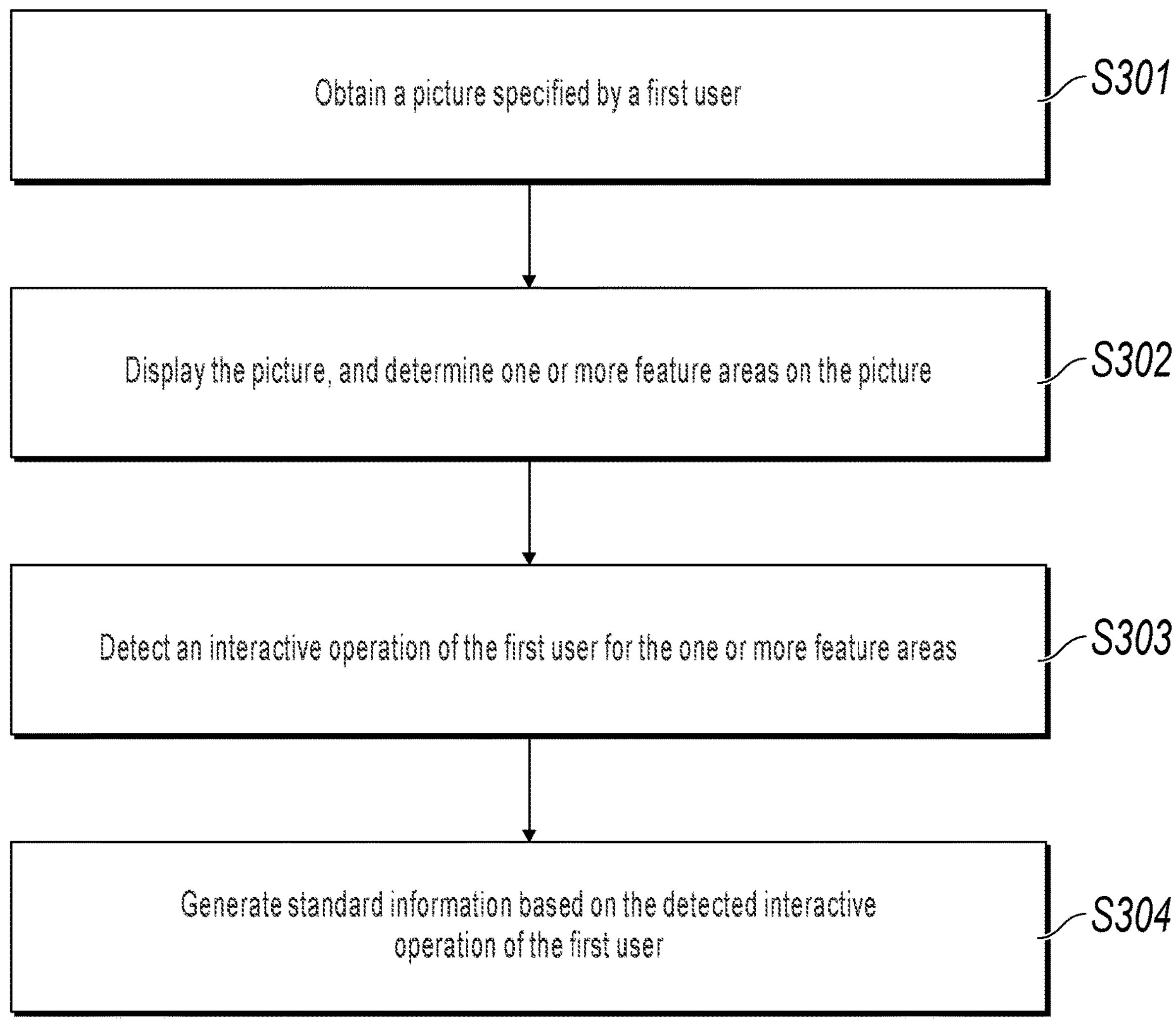
FIG. 3 is a schematic flowchart of generating standard information in FIG. 2, according to an implementation of the present application.

FIG. 3 is a schematic flowchart of generating the standard information in FIG. 2, according to an implementation of the present application. An execution body of the procedure in FIG. 3 and the execution body of the procedure in FIG. 2 can be the same device, or can be different devices.

The procedure in FIG. 3 can include the following steps.

S301. Obtain a picture (that is, a specific picture) specified by a first user.

In this implementation of the present application, related information such as content and format of the specific picture is not limited. Two examples of the specific picture are provided in this implementation of the present application, as shown in FIG. 4.

Figure 4:
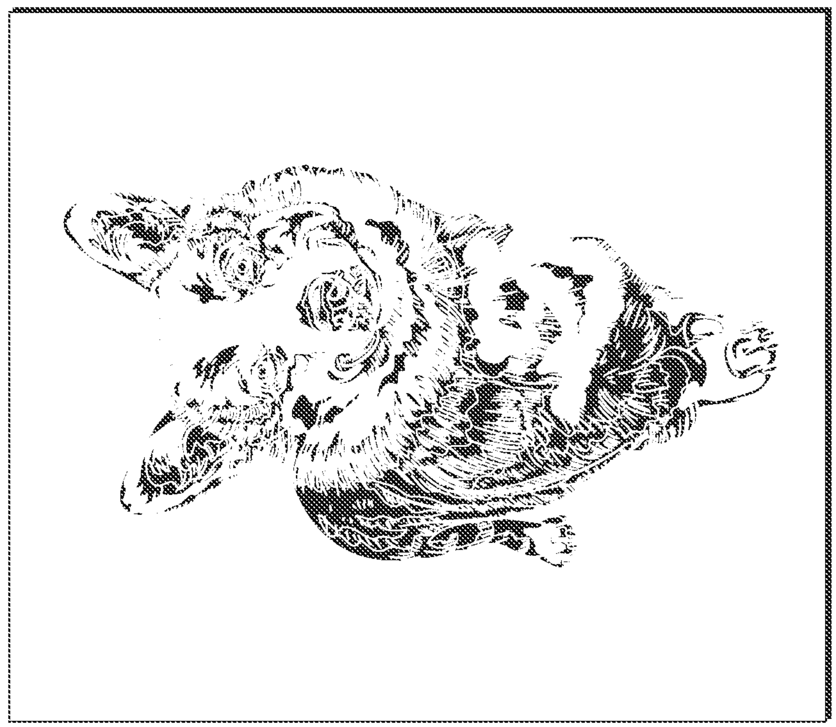
FIG. 4 illustrates two examples of a specific picture, according to an implementation of the present application.

FIG. 4 illustrates two examples of a specific picture, according to the present application, which are respectively the picture of a dog on the left side in FIG. 4 and the picture of a cat on the right side in FIG. 4. For ease of description, the following implementation is also described based on the specific picture examples in FIG. 4.

S302. Display the picture, and determine one or more feature areas on the picture.

In this implementation of the present application, feature detection can be performed on the specific picture based on a specific picture feature area detection algorithm, to determine the one or more feature areas on the specific picture. The feature area can be specified by the execution body or specified by the first user. Based on the method for determining the feature area, user operations and intervention are reduced, and automation degree of the solutions of the present application is improved.

The picture feature area detection algorithm is not limited in the present application, and some example algorithms are listed here. The picture feature area detection algorithm can be scale-invariant feature transform (SIFT) algorithm, speeded up robust features (SURF) algorithm, features from accelerated segment test (FAST) algorithm, oriented FAST and rotated BRIEF (ORB) algorithm, Harris algorithm, binary robust invariant scalable keypoints (BRISK) algorithm, etc. Because different picture feature area detection algorithms can focus on different features, feature areas that can be detected by using different picture feature area detection algorithms can also be different. For example, a circular area on a specific picture can usually be detected by using the SURF algorithm and used as a feature area; and an angular area on a specific picture can usually be detected by using the Harris algorithm and used as a feature area. During implementation of the solutions of the present application, one or more picture feature area detection algorithms can be selected as the specific picture feature area detection algorithm as actually required.

It is worthwhile to note that the number of feature areas that can be determined can vary for different specific pictures. When there are excessive feature areas (for example, a dozen or dozens of feature areas are determined on a specific picture), subsequent operations cannot be performed easily. When there are few feature areas (for example, only one or two feature areas are determined on a specific picture), authentication cannot be performed strictly as expected. To alleviate the problem, the number of feature areas determined or the number of feature areas used for authentication can be limited. For example, the number of feature areas determined by the first user on each specific picture can be limited to 9 or another value. If the limited number is exceeded, some feature areas can be removed, or if the limited number is not reached, some feature areas can be added. As such, the number of feature areas can be appropriate.

In this implementation of the present application, the feature area can also be determined not based on the specific picture feature area detection algorithm, but the first user can directly specify one or more areas on the specific picture as the feature area. The method for determining the feature area has the following advantages: The first user has relatively strong control over the feature area, and because the feature area is specified by the first user, the first user can memorize the feature area more easily.

It can be seen from the previous analysis on the method for determining the feature area that, in this implementation of the present application, the determining one or more feature areas on the picture in step S302 can include the following: performing feature detection on the picture, and determining the one or more feature areas on the specific picture through feature detection; and/or determining one or more areas specified by the first user on the specific picture, and using the one or more areas as the feature area.

In this implementation of the present application, after the feature area is determined, the feature area determined can also be marked on the specific picture displayed, so that the first user can know the feature area determined and can perform an interactive operation for the feature area. The marking can be performed in the form of a text and/or a graphic and/or a color, etc., and the marking can be used to indicate that an area corresponding to the marking is the feature area.

Figure 5:
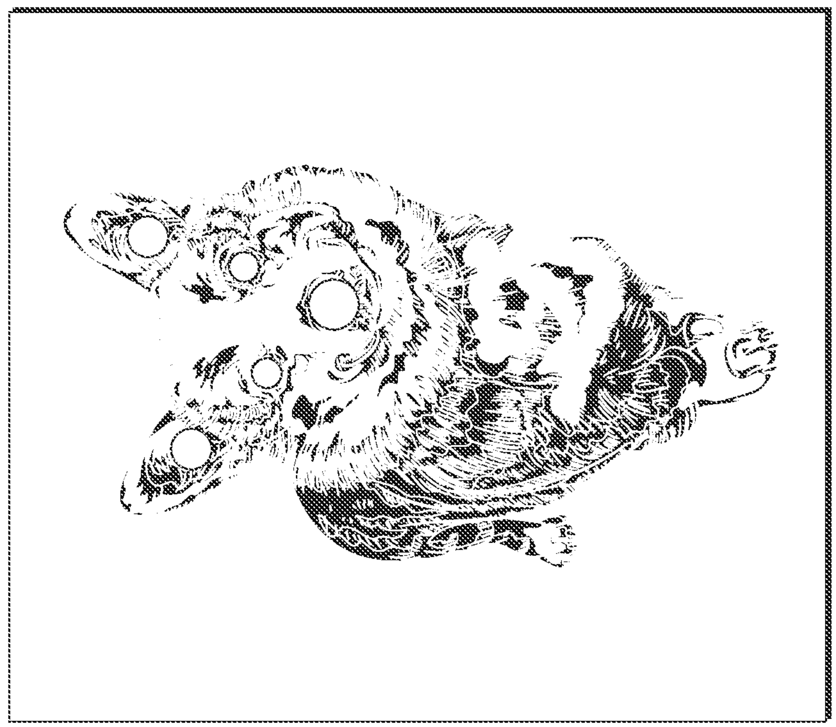
FIG. 5 is a schematic diagram of a feature area determined and marked on a specific picture, according to an implementation of the present application.

This implementation of the present application provides a schematic diagram of a feature area determined and marked on a specific picture, as shown in FIG. 5. The specific picture in FIG. 4 is used as an example.

In FIG. 5, each feature area determined on the specific picture is marked by using a circular graphic. Five feature areas are marked on the specific picture on the left side in FIG. 5, and three feature areas are marked on the specific picture on the right side in FIG. 5.

S303. Detect an interactive operation of the first user for the one or more feature areas.

S304. Generate standard information based on the detected interactive operation of the first user.

In this implementation of the present application, after the standard information is generated, the authentication procedure can be triggered when a predetermined condition is satisfied. In practice, to adjust the strictness of authentication, before the authentication (e.g., before step S201 is performed), setting can be performed for the one or more feature areas. The setting is used to determine whether to mark the one or more feature areas on the displayed picture pre-specified by the first user.

If, through setting, the feature area is marked on the specific picture displayed during authentication, the second user can directly know the feature area on the specific picture due to the marking, which helps the second user reproduce the interactive operation of the first user for the feature area. Therefore, the strictness of authentication is relatively low.

If through setting, the feature area is unmarked on the specific picture displayed during authentication, the second user cannot directly know the feature area on the specific picture. If the second user is not the first user, the second user can hardly determine the feature area on the specific picture, and therefore, can hardly reproduce the interactive operation for the feature area. As such, the strictness of authentication is relatively high, thereby improving information security of the first user.

Figure 6:
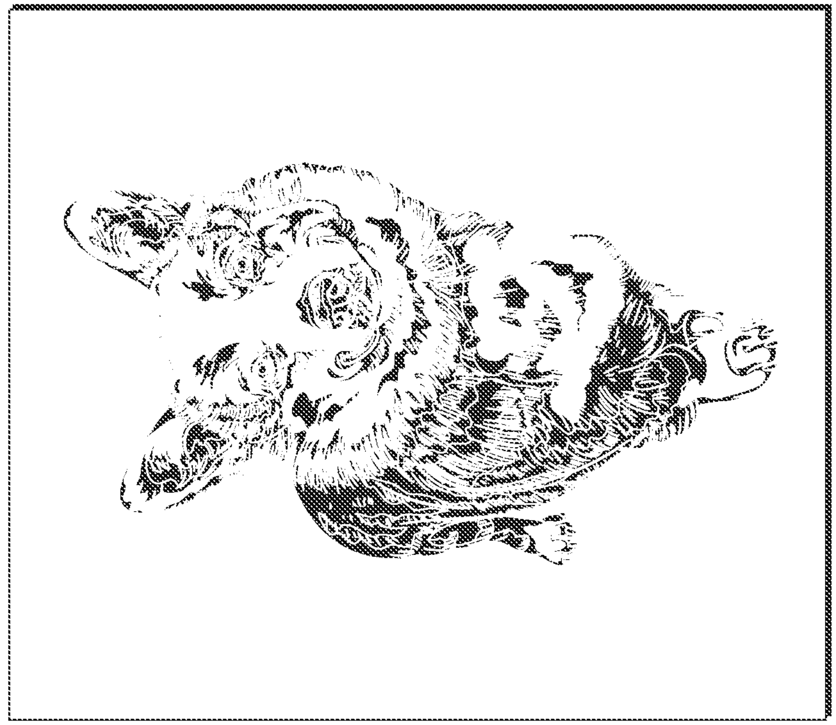
FIG. 6 is a schematic diagram of a specific picture when a feature area is marked or unmarked, according to an implementation of the present application.
Figure 6:
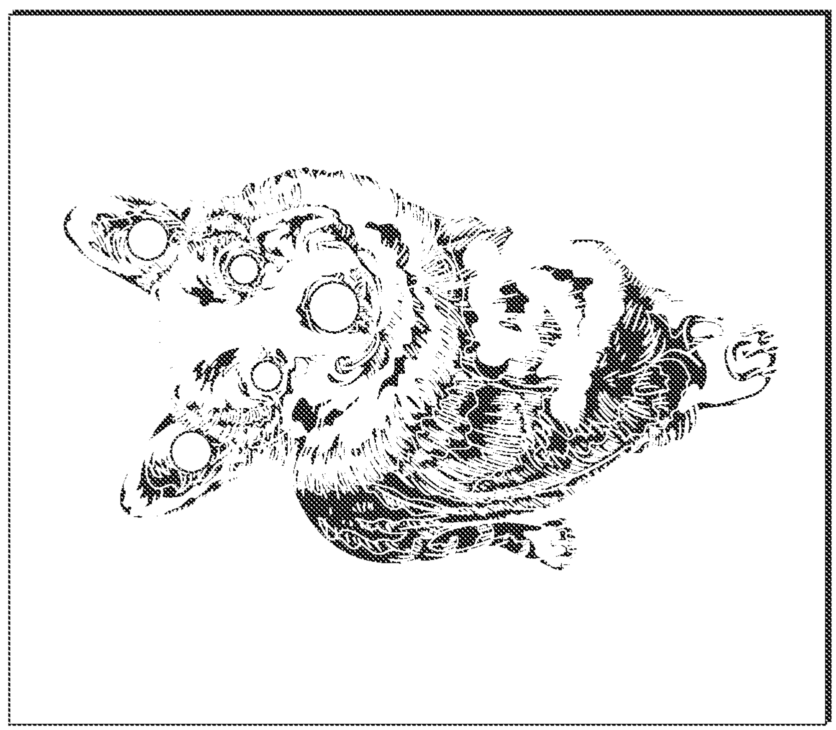

This implementation of the present application provides a schematic diagram of a specific picture when a feature area is marked or unmarked, as shown in FIG. 6. The specific picture on the left side in FIG. 4 is used as an example.

In FIG. 6, the left side in FIG. 6 is a schematic diagram of a specific picture with a marked feature area, and the right side in FIG. 6 is a schematic diagram of a specific picture with an unmarked feature area.

In this implementation of the present application, as mentioned above, interactive operation information can reflect corresponding interactive operation content, and the reflection can be implemented in a plurality of specific methods. Two specific methods are listed as examples below.

Specific method 1: An operation order for feature areas on a specific picture can be a part of interactive operation content. Interactive operation information can reflect only the part of corresponding interactive operation content.

In this case, for ease of representing the operation order, after the one or more feature areas are determined on the specific picture, corresponding identification information can be further generated for each feature area. The identification information can be used to uniquely determine a feature area corresponding to the identification information on the specific picture. For example, the identification information can be coordinate information of the feature area corresponding to the identification information, or can be a character or a character string such as a number or a letter uniquely corresponding to the coordinate information of the feature area corresponding to the identification information.

During generation of the standard information, the generating standard information based on the detected interactive operation of the first user in step S304 can include the following: determining an operation order of the first user for the one or more feature areas based on the detected interactive operation of the first user; and generating a feature area identification information sequence used to indicate the operation order based on the operation order and identification information corresponding to the one or more feature areas, and using the feature area identification information sequence as the standard information.

For example, assume that three feature areas are determined on a specific picture, and identification information corresponding to the three feature areas is generated: respectively numbers “1”, “2”, and “3”. Assume that interactive operations of the user for the three feature areas are sequentially performing a tapping operation for the three feature areas. In this case, an operation order of the first user for the three feature areas is the first feature area, the second feature area, and the third feature area. The operation sequence is represented by using the identification information of the feature areas, and therefore, a feature area identification information sequence “1, 2, 3” or “123” is generated and used as the standard information. It is worthwhile to note that “1, 2, 3” and “123” in this example are examples of the feature area identification information sequence, and do not constitute a limitation. In practice, the feature area identification information sequence can be represented in a form other than the digital sequence, provided that the feature area identification information sequence can indicate the operation order of the first user for the feature areas.

Correspondingly, during authentication, specific method 1 can also be used to generate interactive operation information of the second user. The generating interactive operation information of the second user based on the detected interactive operation of the second user in step 203 can include the following: determining an operation order of the second user for the one or more feature areas based on the detected interactive operation of the second user, when it is determined that the interactive operation of the second user includes an interactive operation of the second user for the one or more feature areas; and generating a feature area identification information sequence used to indicate the operation order based on the operation order and the identification information corresponding to the one or more feature areas, and using the feature area identification information sequence as the interactive operation information of the second user.

Specific method 2: In addition to the operation order, the interactive operation information can reflect more specific interactive operation content. For example, when the interactive operation is a sliding operation, not only an operation order (that is, a sliding track) can be reflected, but also a sliding force can be reflected.

During generation of the standard information, the generating standard information based on the detected interactive operation of the first user in step S304 can include the following: determining an operation order of the first user for the one or more feature areas and an operation feature representation value of the one or more feature areas based on the detected interactive operation of the first user, where the operation feature representation value is used to represent an operation feature when the first user performs the interactive operation for the feature area corresponding to the operation feature representation value; and generating a feature area identification information and operation feature representation value sequence used to indicate the operation order and the operation feature based on the operation order, identification information corresponding to the one or more feature areas, and the operation feature representation value of the one or more feature areas, and using the feature area identification information and operation feature representation value sequence as the standard information.

For example, three feature areas are determined on a specific picture, and identification information corresponding to the three feature areas is generated: respectively numbers “1”, “2”, and “3”. Assume that interactive operations of the user for the three feature areas are performing sliding from the first feature area to the second feature area, and then performing sliding from the second feature area to the third feature area. In this case, an operation order of the first user for the three feature areas is the first feature area, the second feature area, and the third feature area. Further, assume that an operation feature is a sliding force, and the sliding force is classified into “A” and “B” by force. In this case, an operation feature representation value can be “A” or “B”.

Assume that a sliding force of the first user for performing sliding from the first feature area to the second feature area is “A”, and a sliding force of the first user for performing sliding from the second feature area to the third feature area is “B”. In this case, a feature area identification information and operation feature representation value sequence can be generated and used as the standard information: “1, A, 2, B, 3" or "1A2B3". It is worthwhile to note that "1, A, 2, B, 3" and "1A2B3" in this example are examples of the feature area identification information and operation feature representation value sequence, and do not constitute a limitation. In practice, the feature area identification information and operation feature representation value sequence can be represented in a form other than the digital letter sequence, provided that the feature area identification information and operation feature representation value sequence can indicate the operation order of the first user for the feature areas and the operation feature.

Correspondingly, during authentication, specific method 2 can also be used to generate interactive operation information of the second user. Details are omitted here for simplicity.

In this implementation of the present application, during generation of the standard information, to prevent the first user from performing a misoperation, the first user can usually reconfirm the operation (referred to as standard information double confirmation) on the generated standard information. Specifically, standard information can be regenerated and compared with the standard information generated before. If the comparison result is that they are the same, it is determined that the standard information generated can be used for authentication.

Based on the previous descriptions of generating the standard information, an implementation of the present application provides a method for generating information for authentication. Standard information can be generated by performing the method for generating information, and a procedure of the method for generating information is shown in FIG. 7.

Figure 7:
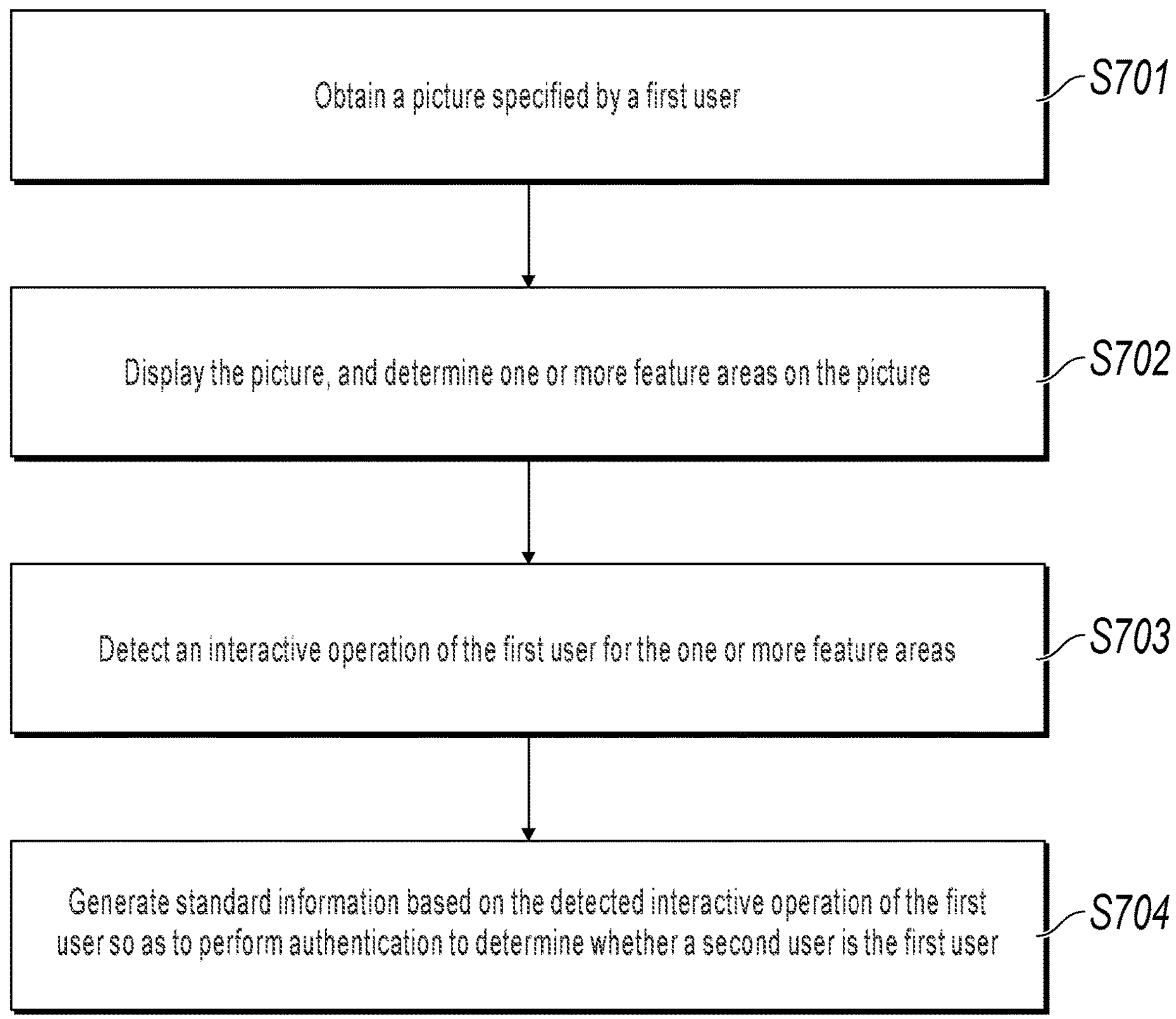
FIG. 7 is a schematic flowchart illustrating a method for generating information for authentication, according to an implementation of the present application.

The procedure in FIG. 7 can include the following steps.

S701. Obtain a picture specified by a first user.

S702. Display the picture, and determine one or more feature areas on the picture.

S703. Detect an interactive operation of the first user for the one or more feature areas.

S704. Generate standard information based on the detected interactive operation of the first user so as to perform authentication to determine whether a second user is the first user.

In this implementation of the present application, the determining one or more feature areas on the picture in step S702 can include the following: performing feature detection on the picture, and determining the one or more feature areas on the specific picture through feature detection; and/or determining one or more areas specified by the first user on the specific picture, and using the one or more areas as the feature area.

Figure 8:
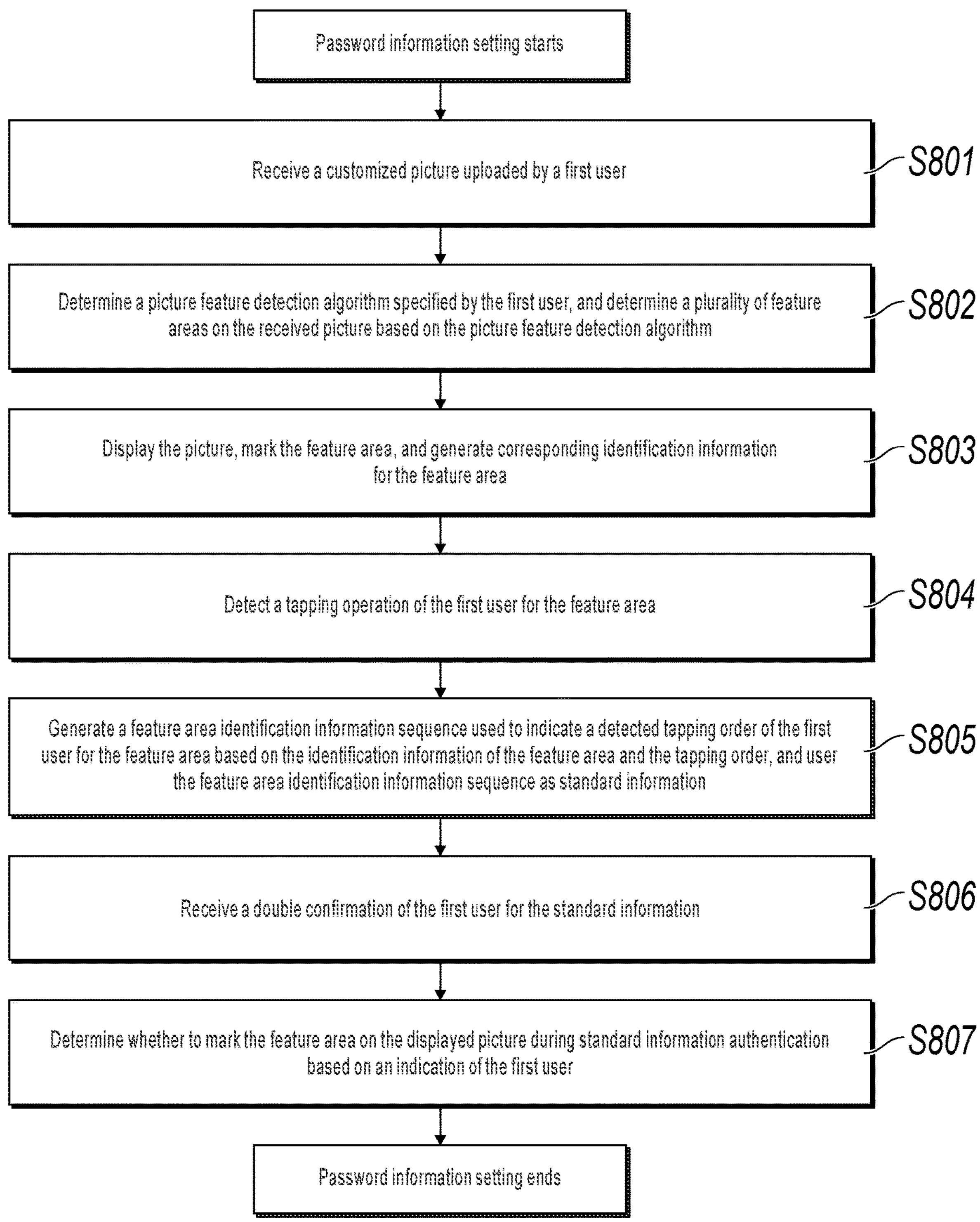
FIG. 8 is a detailed schematic flowchart of generating standard information in actual application scenarios, according to an implementation of the present application.

Further, based on the procedure in FIG. 7 and an extension solution related to the previously described generation of standard information, an implementation of the present application further provides a detailed schematic flowchart of generating standard information in actual application scenarios, as shown in FIG. 8. In the actual application scenarios, an interactive operation is a tapping operation.

The procedure in FIG. 8 can include the following steps.

S801. Receive a customized picture uploaded by a first user.

S802. Determine a picture feature detection algorithm specified by the first user, and determine a plurality of feature areas on the received picture based on the picture feature detection algorithm.

S803. Display the picture, mark the feature area, and generate corresponding identification information for the feature area.

S804. Detect a tapping operation of the first user for the feature area.

S805. Generate a feature area identification information sequence used to indicate a detected tapping order of the first user for the feature area, based on the identification information of the feature area and the tapping order, and use the feature area identification information sequence as standard information.

S806. Receive a double confirmation of the first user for the standard information.

S807. Determine whether to mark the feature area on the displayed picture during standard information authentication based on an indication of the first user.

In this implementation of the present application, when standard information of the previous sequence form and interactive operation information of a second user are identical, it can usually be determined that the second user has reproduced the interactive operation of the first user. In this case, the performing authentication to determine whether the second user is the first user by matching the interactive operation information of the second user and standard information in step 204 can include the following: determining whether the interactive operation information of the second user and the standard information are the same by matching the interactive operation information of the second user and the standard information; and if yes, authenticating the second user as the first user; otherwise, not authenticating the second user as the first user.

In this implementation of the present application, in practice, the second user can also be authenticated as the first user without a requirement that the standard information and the interactive operation information of the second user are the same. Instead, it can be determined whether an interactive operation of the second user and an interactive operation of the first user are the same or similar by matching the standard information and the interactive operation information of the second user, and then authentication is performed based on the determining result. In this case, the performing authentication to determine whether the second user is the first user by matching the interactive operation information of the second user and standard information in step 204 can include the following: determining whether an interactive operation corresponding to the interactive operation information of the second user and an interactive operation corresponding to the standard information are the same, by matching the interactive operation information of the second user and the standard information; if yes, authenticating the second user as the first user; or determining whether a similarity between an interactive operation corresponding to the interactive operation information of the second user and an interactive operation corresponding to the standard information is not less than a predetermined similarity threshold, by matching the interactive operation information of the second user and the standard information; if yes, authenticating the second user as the first user; otherwise, not authenticating the second user as the first user.

In this implementation of the present application, the interactive operation for the picture can usually include a tapping operation for the one or more feature areas on the picture; and/or a sliding operation for performing sliding from one feature area to another when there are a plurality of feature areas on the picture. In addition, the interactive operation can further include a pressing operation for the one or more feature areas on the specific picture, etc.

In practice, in addition to the existing technology mentioned in the background, there is another commonly used existing technology for authentication. However, the other existing technology also has a problem similar to that in the existing technology mentioned in the background.

Figure 9:
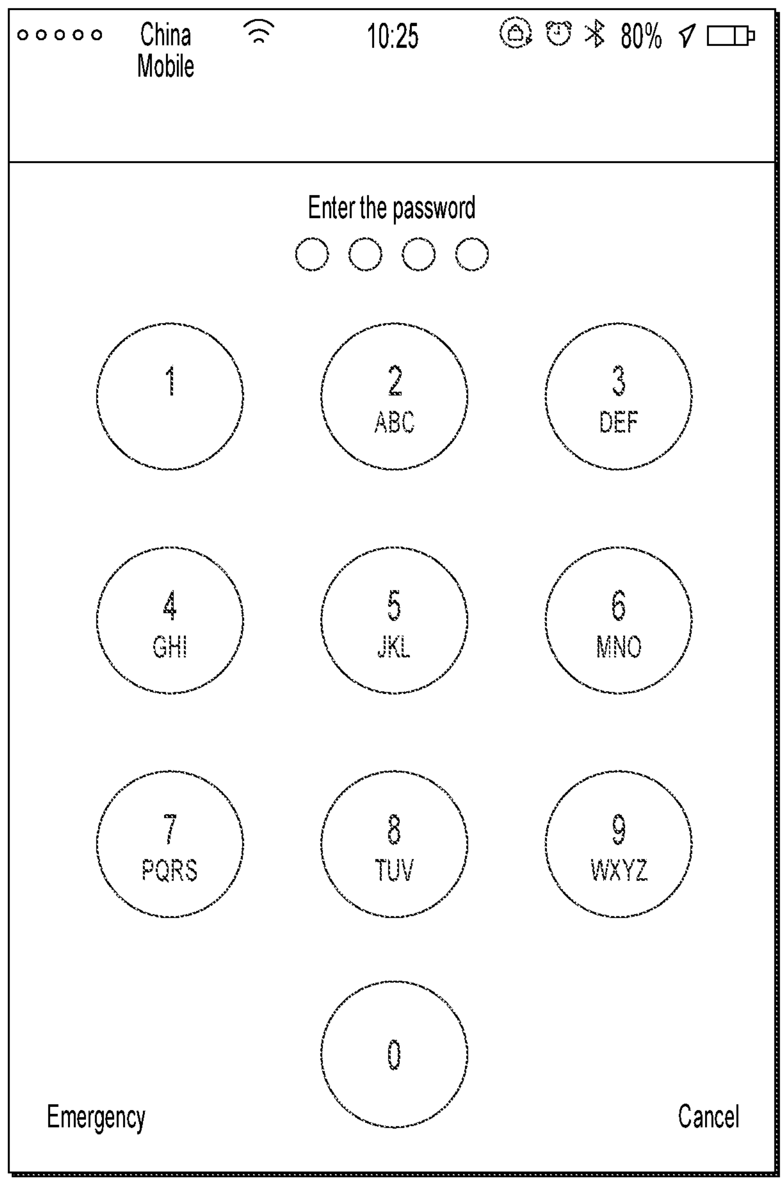
FIG. 9 is a schematic diagram of a standard information input interface in another existing technology.

FIG. 9 is a schematic diagram of a password input interface in another existing technology. In this case, a password is a predetermined digital sequence, and a second user can be authenticated only when the second user taps digital areas in the password input interface to enter the password.

However, the password input interface in FIG. 9 is undiversified, and an attacker is usually familiar with such password input interface, which can cause relatively low authentication reliability.

To alleviate the previously described problem in the existing technology, based on the solutions of the present application, a first user can customize a password input interface, and a password can be the previously described standard information, so that the password input interface can be customized and diversified. Because an attacker may not be familiar with the password input interface customized by the first user, the difficulty of the attacker in peeping at and memorizing the password entered by the first user can be increased, and/or the difficulty of the attacker in cracking the password set by the first user through exhaustive attack can be increased, thereby improving authentication reliability. Therefore, the present application can also partly or wholly alleviate the other problem in the existing technology.

The authentication method and the method for generating information for authentication provided in the implementations of the present application are described above. Based on the same idea, the implementations of the present application further provide a corresponding authentication device and a corresponding device for generating information for authentication, as shown in FIG. 10 and FIG. 11.

Figure 10:
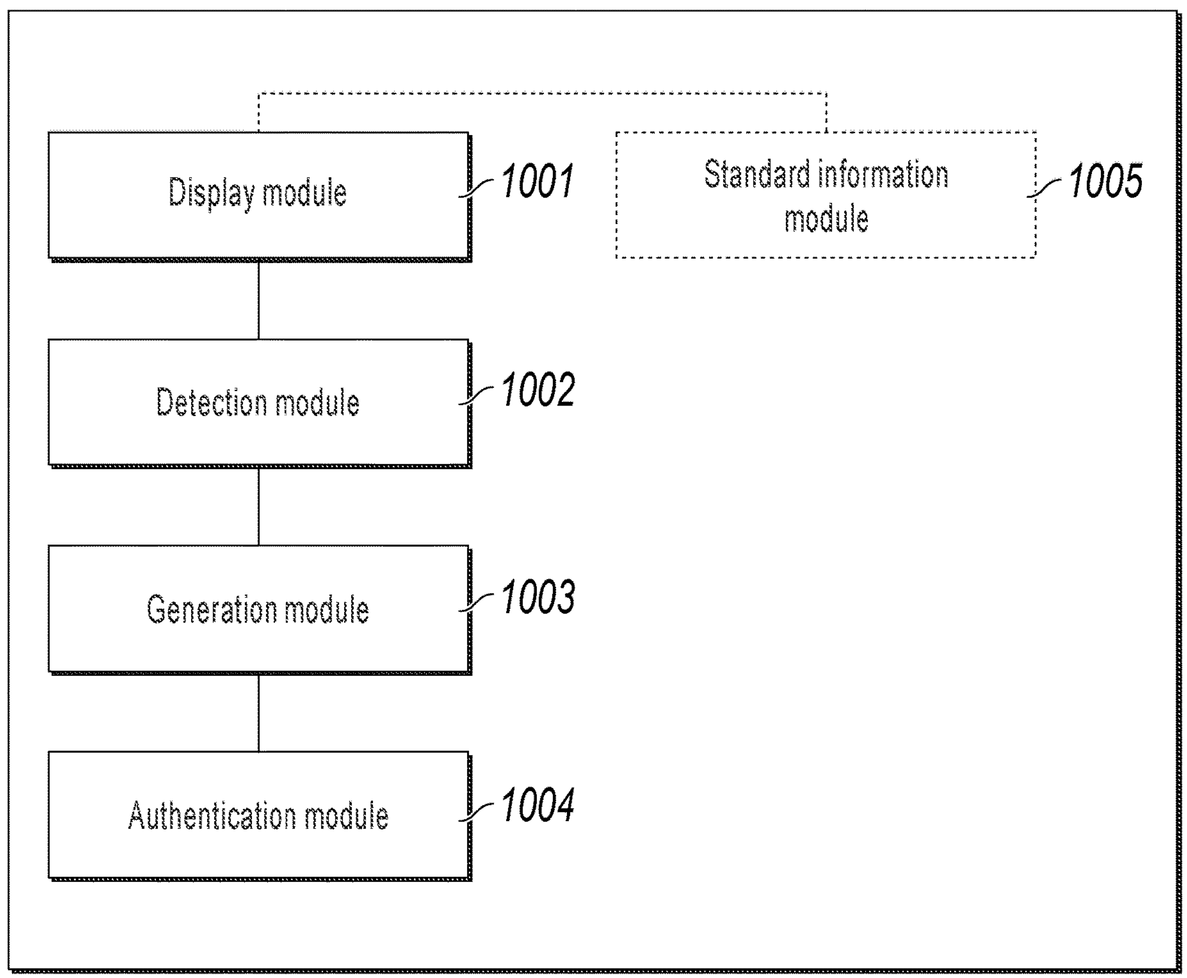
FIG. 10 is a schematic structural diagram illustrating an authentication device, according to an implementation of the present application.
Figure 11:
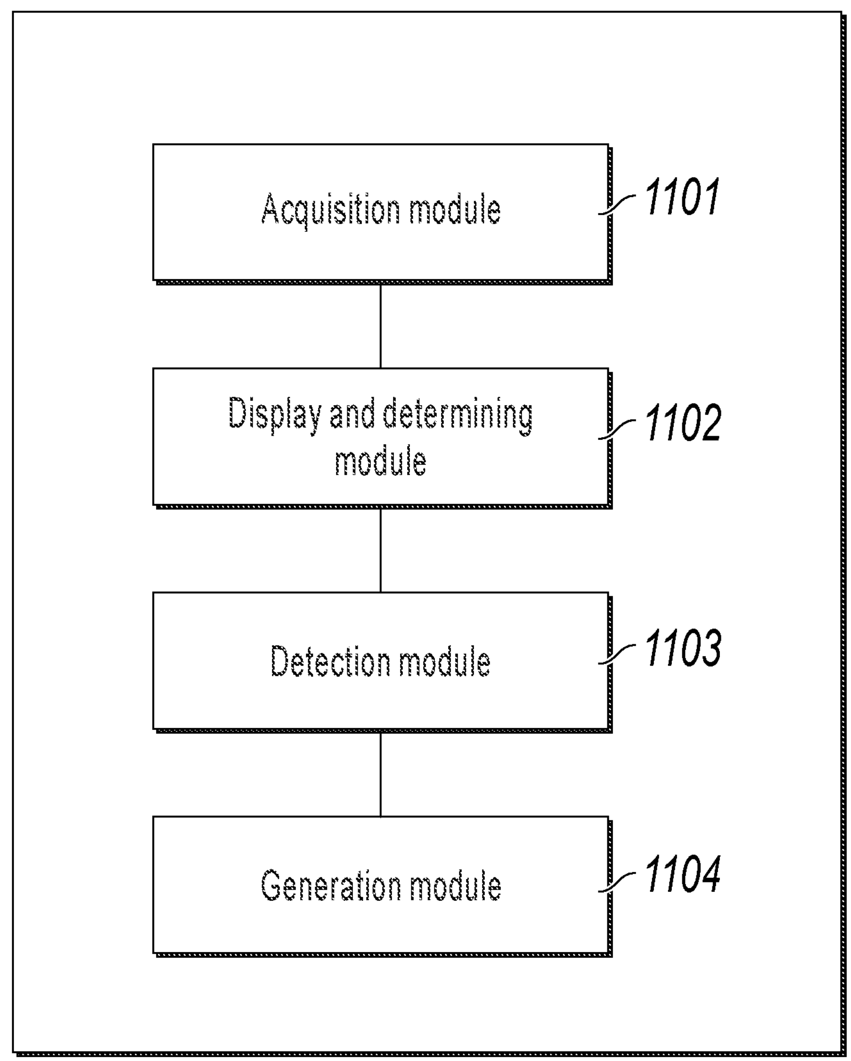
FIG. 11 is a schematic structural diagram illustrating a device for generating information for authentication, according to an implementation of the present application.

FIG. 10 is a schematic structural diagram illustrating an authentication device, according to an implementation of the present application. The device includes a display module 1001, configured to display a picture pre-specified by a first user; a detection module 1002, configured to detect an interactive operation of a second user for the picture; a generation module 1003, configured to generate interactive operation information of the second user based on the detected interactive operation of the second user; and an authentication module 1004, configured to perform authentication to determine whether the second user is the first user by matching the interactive operation information of the second user and standard information, where the standard information is generated based on an interactive operation of the first user for the picture.

Optionally, the device further includes a standard information module 1005, configured to generate the standard information based on the interactive operation of the first user for the picture in the following way: obtaining the picture specified by the first user; displaying the picture, and determining one or more feature areas on the picture; detecting an interactive operation of the first user for the one or more feature areas; and generating the standard information based on the detected interactive operation of the first user.

Optionally, the standard information module 1005 is configured to perform feature detection on the picture, and determine the one or more feature areas on the specific picture through feature detection; and/or determine one or more areas specified by the first user on the specific picture, and use the one or more areas as the feature area.

Optionally, the standard information module 1005 is configured to perform setting for the one or more feature areas before the display module 1001 displays the picture pre-specified by the first user, where the setting is used to determine whether to mark the one or more feature areas on the displayed picture pre-specified by the first user.

Optionally, the standard information module 1005 is configured to generate corresponding identification information for each feature area after determining the one or more feature areas on the picture; determine an operation order of the first user for the one or more feature areas based on the detected interactive operation of the first user; and generate a feature area identification information sequence used to indicate the operation order based on the operation order and identification information corresponding to the one or more feature areas, and use the feature area identification information sequence as the standard information; determine an operation order of the second user for the one or more feature areas based on the detected interactive operation of the second user, when it is determined that the interactive operation of the second user includes an interactive operation of the second user for the one or more feature areas; and generate a feature area identification information sequence used to indicate the operation order based on the operation order and the identification information corresponding to the one or more feature areas, and use the feature area identification information sequence as the interactive operation information of the second user.

Optionally, the authentication module 1004 is configured to determine whether the interactive operation information of the second user and the standard information are the same by matching the interactive operation information of the second user and the standard information; and if yes, authenticate the second user as the first user.

Optionally, the authentication module 1004 is configured to determine whether an interactive operation corresponding to the interactive operation information of the second user and an interactive operation corresponding to the standard information are the same by matching the interactive operation information of the second user and the standard information, and if yes, authenticate the second user as the first user; or determine whether a similarity between an interactive operation corresponding to the interactive operation information of the second user and an interactive operation corresponding to the standard information is not less than a predetermined similarity threshold, by matching the interactive operation information of the second user and the standard information, and if yes, authenticate the second user as the first user.

Optionally, the interactive operation for the picture includes a tapping operation for the one or more feature areas on the picture; and/or a sliding operation of performing sliding from one feature area to another when there are a plurality of feature areas on the picture.

The device in FIG. 10 can be located in an authentication-related device.

FIG. 11 is a schematic structural diagram illustrating a device for generating information for authentication, according to an implementation of the present application. The device includes an acquisition module 1101, configured to obtain a picture specified by a first user; a display and determining module 1102, configured to display the picture, and determine one or more feature areas on the picture; a detection module 1103, configured to detect an interactive operation of the first user for the one or more feature areas; and a generation module 1104, configured to generate standard information based on the detected interactive operation of the first user, so as to perform authentication to determine whether a second user is the first user.

Optionally, the display and determining module 1102 is configured to perform feature detection on the picture, and determine the one or more feature areas on the specific picture through feature detection; and/or determine one or more areas specified by the first user on the specific picture, and use the one or more areas as the feature area.

The device in FIG. 11 can be located in an authentication-related device.

The devices provided in the present application are in a one-to-one mapping relationship with the methods provided in the present application. Therefore, the devices also have beneficial technical effects similar to those of the methods. Because the beneficial technical effects of the methods have been described in detail, beneficial technical effects of the devices are omitted here for simplicity.

A person skilled in the art should understand that the implementations of the present disclosure can be provided as a method, a system, or a computer program product. Therefore, the present disclosure can use a form of hardware only implementations, software only implementations, or implementations with a combination of software and hardware. Moreover, the present disclosure can use a form of a computer program product that is implemented on one or more computer-usable storage media (including but not limited to a magnetic disk storage, a CD-ROM, an optical memory, etc.) that include computer-usable program code.

The present disclosure is described with reference to the flowcharts and/or block diagrams of the method, the device (system), and the computer program product according to the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of another programmable data processing device generate an apparatus for implementing a specific function in one or more processes in the flowcharts and/or in one or more blocks in the block diagrams.

These computer program instructions can be stored in a computer readable memory that can instruct the computer or another programmable data processing device to work in a specific method, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so that a series of operations and steps are performed on the computer or the another programmable device, thereby generating computer-implemented processing. Therefore, the instructions executed on the computer or another programmable device provide steps for implementing a specific function in one or more processes in the flowcharts and/or in one or more blocks in the block diagrams.

In a typical configuration, a computing device includes one or more processors (CPU), an input/output interface, a network interface, and a memory.

The memory can include a non-persistent storage, a random access memory (RAM), a nonvolatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can implement information storage by using any method or technology. Information can be a computer readable instruction, a data structure, a program module, or other data. A computer storage medium includes but is not limited to a phase-change random access memory (PRAM), a static random access memory (SRAM), a dynamic random access memory (DRAM), a random access memory (RAM) of another type, a read-only memory, an electrically erasable programmable read-only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by the computing device. Based on the definition in the present specification, the computer readable medium does not include transitory computer-readable media (transitory computer-readable media), for example, a modulated data signal and carrier.

It is worthwhile to further note that the term "include", "contain", or any other variant thereof is intended to cover a non-exclusive inclusion, so that a process, a method, an article, or a device that includes a list of elements not only includes those elements but also includes other elements which are not expressly listed, or further includes elements inherent to such a process, method, article, or device. An element preceded by "includes a . . . " does not, without more constraints, preclude the existence of additional identical elements in the process, method, article, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. Moreover, the present application can use a form of a computer program product that is implemented on one or more computer-usable storage media (including but not limited to a magnetic disk storage, a CD-ROM, an optical memory, etc.) that include computer-usable program code.

The previous descriptions are merely implementations of the present application, and are not intended to limit the present application. For a person skilled in the art, the present application can have various modifications and changes. Any modifications, equivalent substitutions, improvements, etc. made in the spirit and principle of the present application shall fall within the scope of the claims in the present application.

Figure 12:
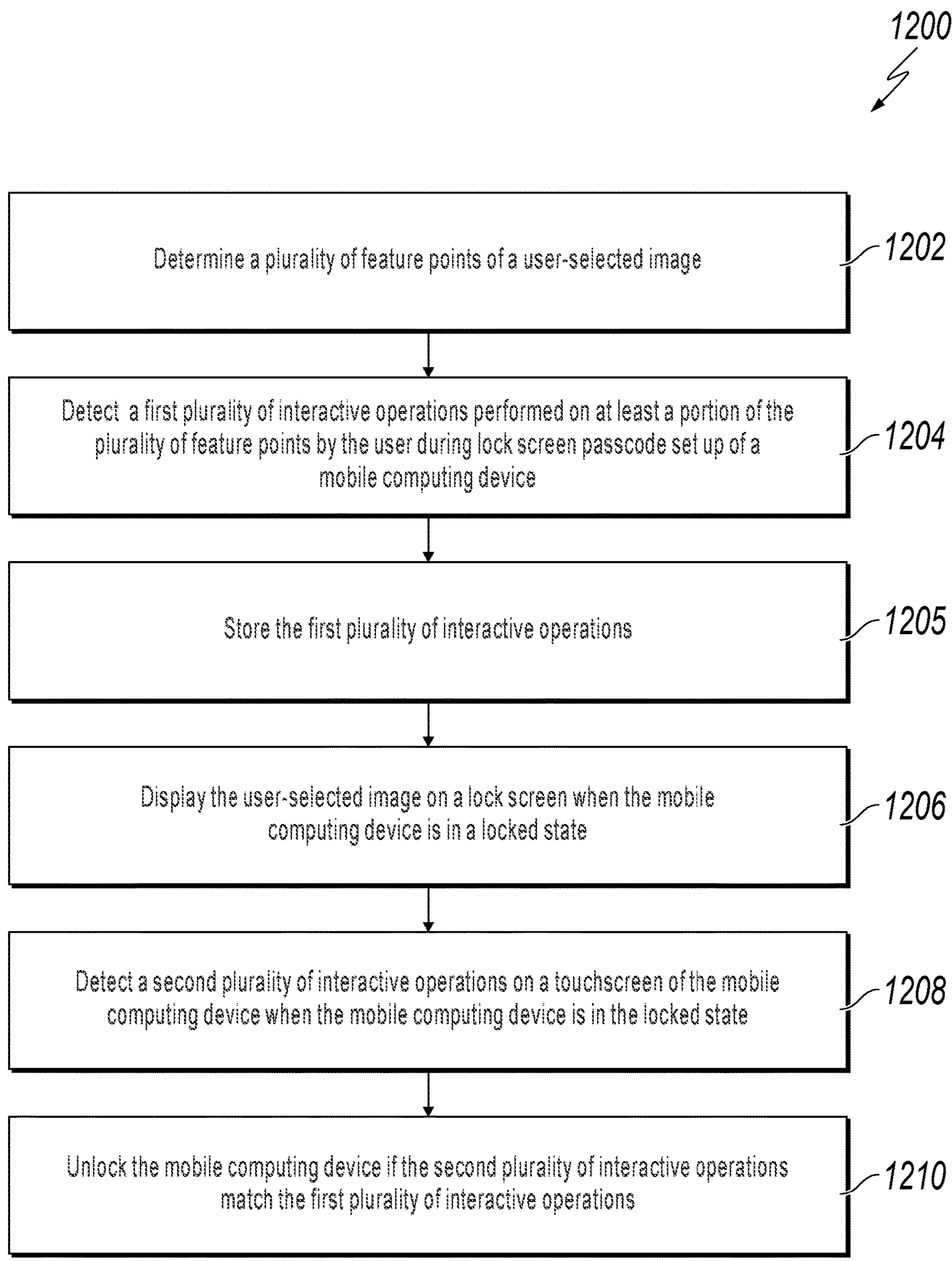
FIG. 12 is a flowchart illustrating an example of a computer-implemented method for processing and displaying data, according to an implementation of the present disclosure.

FIG. 12 is a flowchart illustrating an example of a computer-implemented method 1200 for processing and displaying data, according to an implementation of the present disclosure. For clarity of presentation, the description that follows generally describes method 1200 in the context of the other figures in this description. However, it will be understood that method 1200 can be performed, for example, by any system, environment, software, and hardware, or a combination of systems, environments, software, and hardware, as appropriate. In some implementations, various steps of method 1200 can be run in parallel, in combination, in loops, or in any order.

At 1202, a plurality of feature points of a user-selected image are determined. In some implementations, an image can be uploaded, downloaded, or taken from a camera of the mobile computing device and received by a user before determining the plurality of feature points. In some implementations, the plurality of feature points of the image are determined by at least one of the mobile computing device (for example, using an automatic determination process) or one or more selections made by the user. In some implementations, at least one feature area of the selected image is determined and the plurality of feature points are determined from the at least one feature area. From 1202, method 1200 proceeds to 1204.

At 1204, a first plurality of interactive operations performed on at least a portion of the plurality of feature points by the user during lock screen passcode set up of a mobile computing device are detected. In some implementations, the first plurality of interactive operations and the second plurality of interactive operations can be at least one of a plurality of strokes that connect at least a portion of the plurality of feature points to form a pattern or a plurality of tapping operations on at least a portion of the plurality of feature points. From 1204, method 1200 proceeds to 1205.

At 1205, the plurality of feature points are stored. For example, the detected plurality of features can be stored in a computer data storage area. In some implementations, the computer data storage area can be associated with a mobile computing device, a cloud-type computing network, or other computer data storage area. From 1205, method 1200 proceeds to 1206.

At 1206, the user-selected image on a lock screen is displayed when the mobile computing device is in a locked state. displaying the user-selected image on the lock screen further comprises displaying the plurality of the feature points superimposed on the user-selected image. From 1206, method 1200 proceeds to 1208.

At 1208, a second plurality of interactive operations are detected on a display (for example, a touchscreen) of the mobile computing device when the mobile computing device is in the locked state. From 1208, method 1200 proceeds to 1210.

At 1210, the mobile computing device is unlocked if the second plurality of interactive operations match the first plurality of interactive operations. The second plurality of interactive operations are considered to match the first plurality of interactive operations when the interactive operations are performed on same at least a portion of the plurality of feature points in the same order. After 1210, method 1200 can stop.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:

selecting, based on one or more features of a user-selected image and as a selected algorithm, one or more of a plurality of feature area detection algorithms based on a shape of one or more feature areas on the user-selected image, wherein each one of the plurality of feature area detection algorithms detects a feature area having a respective shape;

determining a plurality of feature points of the user-selected image using the selected algorithm;

in response to determining the plurality of feature points, detecting a first plurality of interactive operations performed on at least a portion of the plurality of feature points by a user during lock screen passcode set up of a mobile computing device, wherein the first plurality of interactive operations comprise a sliding force for a sliding operation from a first feature point to a second feature point among the plurality of feature points, and wherein the sliding force corresponds to one of a plurality of levels of predetermined sliding forces;

storing the first plurality of interactive operations;

displaying the user-selected image on a lock screen when the mobile computing device is in a locked state;

determining that the plurality of feature points are set to be unmarked on the user-selected image displayed on the lock screen;

in response to determining that the plurality of feature points are set to be unmarked, detecting a second plurality of interactive operations on a touchscreen of the mobile computing device when the mobile computing device is in the locked state and when the plurality of feature points are unmarked on the user-selected image displayed on the lock screen; and unlocking the mobile computing device when the second plurality of interactive operations match the first plurality of interactive operations, wherein the second plurality of interactive operations match the first plurality of interactive operations when the second plurality of interactive operations are performed on at least a portion of the plurality of feature points with same orders and with same level of sliding force.

2. The computer-implemented method of claim 1, further comprising receiving an image from a camera of the mobile computing device before determining the plurality of feature points.

3. The computer-implemented method of claim 1, wherein the plurality of feature points of the image are determined by at least one of the mobile computing device or one or more selections made by the user.

4. The computer-implemented method of claim 1, wherein the first plurality of interactive operations and the second plurality of interactive operations are at least one of a plurality of strokes that connect at least a portion of the plurality of feature points to form a pattern or a plurality of tapping operations on at least a portion of the plurality of feature points.

5. The computer-implemented method of claim 1, further comprising determining at least one feature area of the user-selected image and wherein the plurality of feature points are determined from the at least one feature area.

6. A non-transitory, computer-readable medium storing one or more instructions executable by a computer system to perform operations comprising:

selecting, based on one or more features of a user-selected image and as a selected algorithm, one or more of a plurality of feature area detection algorithms based on a shape of one or more feature areas on the user-selected image, wherein each one of the plurality of feature area detection algorithms detects a feature area having a respective shape;

determining a plurality of feature points of the user-selected image using the selected algorithm;

in response to determining the plurality of feature points, detecting a first plurality of interactive operations performed on at least a portion of the plurality of feature points by a user during lock screen passcode set up of a mobile computing device, wherein the first plurality of interactive operations comprise a sliding force for a sliding operation from a first feature point to a second feature point among the plurality of feature points, and wherein the sliding force corresponds to one of a plurality of levels of predetermined sliding forces;

storing the first plurality of interactive operations;

displaying the user-selected image on a lock screen when the mobile computing device is in a locked state;

determining that the plurality of feature points are set to be unmarked on the user-selected image displayed on the lock screen;

in response to determining that the plurality of feature points are set to be unmarked, detecting a second plurality of interactive operations on a touchscreen of the mobile computing device when the mobile computing device is in the locked state and when the plurality of feature points are unmarked on the user-selected image displayed on the lock screen; and unlocking the mobile computing device when the second plurality of interactive operations match the first plurality of interactive operations, wherein the second plurality of interactive operations match the first plurality of interactive operations when the second plurality of interactive operations are performed on at least a portion of the plurality of feature points with same orders and with same level of sliding force.

7. The non-transitory, computer-readable medium of claim 6, further comprising receiving an image from a camera of the mobile computing device before determining the plurality of feature points.

8. The non-transitory, computer-readable medium of claim 6, wherein the plurality of feature points of the image are determined by at least one of the mobile computing device or one or more selections made by the user.

9. The non-transitory, computer-readable medium of claim 6, wherein the first plurality of interactive operations and the second plurality of interactive operations are at least one of a plurality of strokes that connect at least a portion of the plurality of feature points to form a pattern or a plurality of tapping operations on at least a portion of the plurality of feature points.

10. The non-transitory, computer-readable medium of claim 6, further comprising determining at least one feature area of the user-selected image and wherein the plurality of feature points are determined from the at least one feature area.

11. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

selecting, based on one or more features of a user-selected image and as a selected algorithm, one or more of a plurality of feature area detection algorithms based on a shape of one or more feature areas on the user-selected image, wherein each one of the plurality of feature area detection algorithms detects a feature area having a respective shape;

determining a plurality of feature points of the user-selected image using the selected algorithm;

in response to determining the plurality of feature points, detecting a first plurality of interactive operations performed on at least a portion of the plurality of feature points by a user during lock screen passcode set up of a mobile computing device, wherein the first plurality of interactive operations comprise a sliding force for a sliding operation from a first feature point to a second feature point among the plurality of feature points, and wherein the sliding force corresponds to one of a plurality of levels of predetermined sliding forces;

storing the first plurality of interactive operations;

displaying the user-selected image on a lock screen when the mobile computing device is in a locked state;

determining that the plurality of feature points are set to be unmarked on the user-selected image displayed on the lock screen;

in response to determining that the plurality of feature points are set to be unmarked, detecting a second plurality of interactive operations on a touchscreen of the mobile computing device when the mobile computing device is in the locked state and when the plurality of feature points are unmarked on the user-selected image displayed on the lock screen; and unlocking the mobile computing device when the second plurality of interactive operations match the first plurality of interactive operations, wherein the second plurality of interactive operations match the first plurality of interactive operations when the second plurality of interactive operations are performed on at least a portion of the plurality of feature points with same orders and with same level of sliding force.

12. The computer-implemented system of claim 11, further comprising receiving an image from a camera of the mobile computing device before determining the plurality of feature points.

13. The computer-implemented system of claim 11, wherein the plurality of feature points of the image are determined by at least one of the mobile computing device or one or more selections made by the user.

14. The computer-implemented system of claim 11, wherein the first plurality of interactive operations and the second plurality of interactive operations are at least one of a plurality of strokes that connect at least a portion of the plurality of feature points to form a pattern or a plurality of tapping operations on at least a portion of the plurality of feature points.

* * * * *